US012770504B2

(12) United States Patent
Kim et al.

(10) Patent No.: US 12,770,504 B2
(45) Date of Patent: Oct. 20, 2026

(54) METHOD AND SYSTEM FOR ANALYZING DRIVING PATTERNS

(71) Applicants: MORAI INC., Seoul (KR); KOREA TRANSPORTATION SAFETY AUTHORITY, Gimcheon-Si (KR)

(72) Inventors: Jonghwa Kim, Seoul (KR); Hangeom Ko, Gimcheon-Si (KR); Inseong Choi, Gimcheon-si (KR)

(73) Assignees: MORAI INC., Seoul (KR); KOREA TRANSPORATION SAFETY AUTHORITY, Gimcheon-Si (KR)

( * ) Notice: Subject to any disclaimer, the term of this patent is extended or adjusted under 35 U.S.C. 154(b) by 0 days.

(21) Appl. No.: 18/925,797

(22) Filed: Oct. 24, 2024

(65) Prior Publication Data

US 2025/0378755 A1 Dec. 11, 2025

(30) Foreign Application Priority Data

Jun. 7, 2024 (KR) ........................ 10-2024-0074535

(51) Int. Cl.

| | |
|---|---|
| ***G08G 1/01*** | (2006.01) |
| ***B60W 40/10*** | (2012.01) |
| ***B60W 50/00*** | (2006.01) |
| ***B60W 60/00*** | (2020.01) |
| ***G08G 1/0967*** | (2006.01) |

(52) U.S. Cl.
CPC ......... *G08G 1/0137* (2013.01); *B60W 60/001* (2020.02)

(58) Field of Classification Search
CPC ............... G08G 1/0137; G08G 1/0112; G08G 1/096725; G08G 1/096741; G08G 1/096775; G08G 1/0129; B60W 60/001
See application file for complete search history.

(56) References Cited

U.S. PATENT DOCUMENTS 9,495,874 B1 * 11/2016 Zhu .................. G08G 1/096741
11,685,408 B1 * 6/2023 Zhao .................... G07C 5/0841
701/25

(Continued)

FOREIGN PATENT DOCUMENTS

JP 2016-66320 A 4/2016
JP 2020-67656 A 4/2020

(Continued)

OTHER PUBLICATIONS

Yu Wang et al: "Multiverse Transformer: 1st Place Solution forWaymo Open Sim Agents Challenge 2023", Arxiv.Org, Cornell University Library, 201 Olinlibrary Cornell University Ithaca, NY 14853, XP091543834,.

(Continued)

*Primary Examiner* — Harry Y Oh
(74) *Attorney, Agent, or Firm* — Banner & Witcoff, Ltd.

(57) ABSTRACT

A method of analyzing vehicle driving patterns performed by at least one processor is disclosed. The method comprises obtaining first actual driving data associated with a first plurality of vehicles driving on an actual road within a first zone, and generating vehicle driving patterns for each of a plurality of areas within the actual road based on the first actual driving data, and wherein the first actual driving data comprises speed data, heading data, and location data of a vehicle.

20 Claims, 11 Drawing Sheets

(56) References Cited

U.S. PATENT DOCUMENTS

| | | | | |
|---|---|---|---|---|
| 11,840,262 | B2 * | 12/2023 | Park | G08G 1/096725 |
| 12,017,659 | B2 * | 6/2024 | Mukundan | G08G 1/164 |
| 2020/0338983 | A1 * | 10/2020 | Alalao | B60K 35/22 |
| 2024/0196105 | A1 * | 6/2024 | Taylor | G06T 7/90 |
| 2024/0337501 | A1 * | 10/2024 | Hatfield | G01C 21/3841 |

FOREIGN PATENT DOCUMENTS

| | | | |
|---|---|---|---|
| KR | 10-2021-0027559 | A | 3/2021 |
| KR | 10-2022-0068922 | A | 5/2022 |
| KR | 10-2022-0082538 | A | 6/2022 |

OTHER PUBLICATIONS

Barbier Mathieu et al: "Classification of drivers manoeuvrefor road intersection crossing with synthethic and real data",2017 IEEE Intelligent Vehicles Symposium (IV), IEEE, pp. 224-230, XP033133712, DOI: 10.1109/IVS.2017.7995724[retrieved on Jul. 28, 2017].

Romero-Cano Victor et al: ""Unsupervised motion learning from a moving platform"",2013 IEEE Intelligent Vehicles Symposiumworkshops (IV Workshops), IEEE, pp. 104-108, XP032491726,DOI: 10.1109/IVWORKSHOPS.2013.6615234[retrieved on Sep. 27, 2013].

* cited by examiner

700

METHOD AND SYSTEM FOR ANALYZING DRIVING PATTERNS

CROSS-REFERENCE TO RELATED APPLICATION

This application claims priority to Korean Patent Application No. 10-2024-0074535, filed in the Korean Intellectual Property Office on Jun. 7, 2024, the entire contents of which are hereby incorporated by reference.

BACKGROUND

Field

Aspects of the present disclosure relate to a method and system for analyzing vehicle driving patterns, and more particularly, to a method and system for analyzing driving patterns of a vehicle based on data obtained from actual road environments.

Description of Related Art

In recent years, the autonomous vehicle market has expanded rapidly due to advancements of autonomous driving technology. However, along with these advancements, there are growing concerns about the reliability of autonomous driving technology as well. This is because autonomous driving artificial intelligence (AI) is not yet mature enough and lacks the ability to handle unexpected situations. In light of these situations, it is desirable to improve the method of training and validating autonomous driving AI.

Training of autonomous driving AI has mainly been carried out through rule-based heuristics or repeated experiments conducted on actual roads. However, such methods have difficulty predicting and preparing for unpredictable situations and is resource-intensive.

Further, because most trajectories are collected by moving data collection vehicles, they are often obscured by other traffic participants and thus are collected for only a short period of time. For example, only 30% of the trajectories collected in the Waymo motion dataset last 10 seconds or longer, and only 12% cover the entire scenario. Therefore, the reproduced traffic scenario is incomplete and insufficient to evaluate virtual driving systems more accurately and thoroughly.

SUMMARY

The present disclosure provides a method, a computer program stored in a recording medium, and a system for analyzing vehicle driving patterns to solve the problems as described above.

According to an example of the present disclosure, a method of analyzing vehicle driving patterns performed by at least one processor may comprise obtaining first actual driving data associated with a first plurality of vehicles driving on an actual road within a first zone, and generating vehicle driving patterns for each of a plurality of areas within the actual road based on the first actual driving data, and wherein the first actual driving data may comprise speed data, heading data, and location data of a vehicle.

According to an example of the present disclosure, the generating the vehicle driving patterns for each of the plurality of areas may comprise performing denoising on the received first actual driving data, generating a first cluster and a second cluster by performing clustering on the denoised first actual driving data, generating vehicle driving patterns associated with a first area based on data included in the first cluster, and generating vehicle driving patterns associated with a second area based on data included in the second cluster.

According to an example of the present disclosure, the obtaining the first actual driving data may comprise receiving road map data associated with a second zone including the first zone, wherein the road map data comprises a plurality of driving route links and a plurality of nodes, obtaining second actual driving data associated with a second plurality of vehicles driving on an actual road within the second zone, setting the first zone as a region of interest based on the plurality of driving route links, and extracting the first actual driving data associated with the region of interest from the second actual driving data, and wherein the plurality of areas may be included in the region of interest.

According to an example of the present disclosure, the obtaining the actual driving data may comprise receiving satellite map data associated with a second zone including the first zone, obtaining second actual driving data associated with a second plurality of vehicles driving on an actual road within the second zone, receiving information on at least one region including lanes on the satellite map data, and extracting the first actual driving data associated with the at least one region from the second actual driving data.

According to an example of the present disclosure, the performing the denoising may comprise performing primary filtering on the first actual driving data based on the heading data, and performing secondary filtering on the first actual driving data that has been subjected to the primary filtering by performing linear regression analysis.

According to an example of the present disclosure, the generating the first cluster and the second cluster may comprise generating a plurality of cluster candidates by performing clustering using speed data of the denoised first actual driving data, determining cluster candidates having a dispersion uniformity greater than or equal to a preset threshold out of the plurality of cluster candidates as the first cluster and the second cluster, generating speed data statistical values for the first cluster, and generating speed data statistical values for the second cluster.

According to an example of the present disclosure, the vehicle driving patterns for each of the plurality of areas may represent a driving speed increase/decrease pattern of a vehicle.

According to an example of the present disclosure, a particular area of the plurality of areas may comprise a first vehicle driving pattern and a second vehicle driving pattern, and the first vehicle driving pattern and the second vehicle driving pattern may be different from each other.

According to an example of the present disclosure, the method may further comprise performing an autonomous driving simulation associated with an actual road within the first zone based on the generated vehicle driving patterns for each of the plurality of areas.

There is provided a non-transitory computer-readable recording medium storing instructions for executing the method for analyzing vehicle driving patterns on a computer.

According to an example of the present disclosure, an information processing system may comprise a communication module, a memory and at least one processor connected to the memory and configured to execute at least one computer-readable program included in the memory, wherein the at least one program may include instructions for obtaining first actual driving data associated with a first plurality of vehicles driving on an actual road within a first zone, and generating vehicle driving patterns for each of a plurality of areas within the actual road based on the first actual driving data, and wherein the first actual driving data may comprise speed data, heading data, and location data of a vehicle.

According to an example of the present disclosure, various vehicle driving patterns included in large-scale data can be extracted by automatically analyzing the large-scale data associated with vehicles driving on actual roads, thereby reducing the time and costs required to extract various vehicle driving patterns.

According to an example of the present disclosure, it is possible to more accurately simulate various road conditions similar to actual roads by generating autonomous driving scenarios using the extracted various vehicle patterns.

The effects of the present disclosure are not limited to those mentioned above, and other effects that have not been mentioned will be clearly understood by those having ordinary skill in the art from the following description.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which.

DETAILED DESCRIPTION

Figure 1:
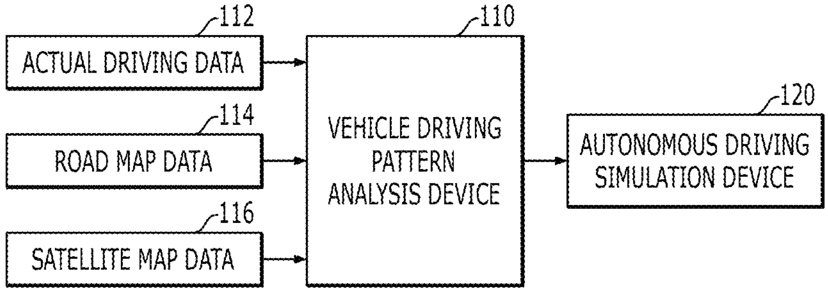
FIG. 1 is a diagram showing an example in which a vehicle driving pattern analysis device analyzes vehicle driving patterns based on input data in accordance with an example of the present disclosure.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Accordingly, the terms used in this disclosure should be defined based on the meaning of the term and the overall content of the present disclosure, rather than simply the name of the term.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it is intended as meaning that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

A "module" or "unit" may be implemented as a processor and a memory, or may be implemented as a circuit (circuitry). Terms such as circuit and circuitry may refer to circuits in hardware, but may also refer to circuits in software. The "processor" should be interpreted broadly to encompass a general-purpose processor, a central processing unit (CPU), a microprocessor, a digital signal processor (DSP), a neural processing unit (NPU), a controller, a microcontroller, a state machine, etc. Under some circumstances, the "processor" may refer to an application-specific integrated circuit (ASIC), a programmable logic device (PLD), a field-programmable gate array (FPGA), etc. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EE-PROM), flash memory, magnetic or optical data storage, registers, etc. The memory is said to be in electronic communication with a processor if the processor can read information from and/or write information to the memory. The memory integrated with the processor is in electronic communication with the processor.

In addition, terms such as first, second, A, B, (a), (b), etc. used in the following examples are only used to distinguish certain components from other components, and the nature, sequence, order, etc. of the components are not limited by the terms.

In addition, in the following examples, if a certain component is stated as being "connected," "combined" or "coupled" to another component, it is to be understood that there may be yet another intervening component "connected," "combined" or "coupled" between the two components, although the two components may also be directly connected or coupled to each other.

In addition, as used in the following examples, "comprise" and/or "comprising" does not foreclose the presence or addition of one or more other elements, steps, operations, and/or devices in addition to the recited elements, steps, operations, or devices.

In the present disclosure, a "system" may include at least one of a server device and a cloud device, but is not limited thereto. For example, the system may be formed of one or more server devices. As another example, the system may be formed of one or more cloud devices. As yet another example, the system may operate by being formed of a server device and a cloud device together.

In the present disclosure, a "link" may refer to a straight/curved line and/or a vertex for defining a route along which a vehicle included in the data of a precision road map can proceed without changing lanes, and may connect nodes. Furthermore, the "link' may include directional data associated with a line. The link may include a vehicle driving link representing a route along which a vehicle can proceed without changing lanes and a walking link along which a person can move on foot. The link may refer to a vehicle driving link and/or a walking link.

In the present disclosure, a "vertex" may refer to a point, or a point, a point group, a vertex, an apex, etc., that constitutes a polygon included in the data of a precision road map or the data of a digital twin virtual environment.

Hereinafter, various examples of the present disclosure will be described in detail based on the accompanying drawings.

FIG. 1 is a diagram showing an example in which a vehicle driving pattern analysis device 110 analyzes vehicle driving patterns based on input data 112, 114, and 116 in accordance with an example of the present disclosure.

Referring to FIG. 1, the vehicle driving pattern analysis device 110 may receive and store actual driving data 112 associated with a plurality of vehicles driving on actual roads, and road map data 114 or satellite map data 116 on which the plurality of vehicles are driving.

The actual driving data 112 may be initially collected by infrastructure sensors, and may include a large amount of raw data including the accurate location data of the vehicles, the speed data of the vehicles, and the heading data of the vehicles, which have been transformed through the coordinate system transformation. The infrastructure sensors may include at least one of a camera, a lidar, and a radar attached to a vehicle, and a closed-circuit television (CCTV) installed on an actual road.

The road map data 114 may be map data associated with the actual roads on which the actual driving data 112 have been collected, and may include a plurality of driving route links and a plurality of nodes. In one example, the road map data 114 may be precision road map data.

The satellite map data 116 may be map data associated with the actual roads on which the actual driving data 112 have been collected, and may be based on satellite coordinates.

According to an example, the vehicle driving pattern analysis device 110 may automatically generate vehicle driving patterns for each of a plurality of areas within an actual road based on the actual driving data 112 and the map data 114 or 116. To this end, the vehicle driving pattern analysis device 110 may set a desired zone in the map data 114 or 116 and select first actual driving data associated with a plurality of vehicles driving in the set zone from the actual driving data 112. The set zone may include a plurality of areas including actual roads.

The vehicle driving pattern analysis device 110 may perform denoising on the first actual driving data. The vehicle driving pattern analysis device 110 may select data within 1SD (standard deviation) of a reference value (e.g., the median or mean of the heading data of the first actual driving data) by primary filtering in order to maintain the consistency of the heading data. Then, the vehicle driving pattern analysis device 110 may perform secondary filtering by applying linear regression analysis to the first actual driving data that has been subjected to the primary filtering.

The vehicle driving pattern analysis device 110 may generate a plurality of clusters and then further cluster them in order to select an optimal cluster from the first actual driving data that has been subjected to the secondary filtering, which can ensure optimal cluster selection by further clustering with a target of a minimum number of clusters of 90% or more. The clustering may be performed on the speed data of the first actual driving data that has been subjected to the secondary filtering.

The vehicle driving pattern analysis device 110 may generate vehicle driving patterns for each of the plurality of areas set in the map data 114 or 116 by calculating the speed data statistical values and ratios of each cluster for the clustered data. The vehicle driving patterns for each of the plurality of areas may be patterns regarding whether the driving speed of the vehicle increases or decreases in each area, etc. A particular area of the plurality of areas may include a first vehicle driving pattern and a second vehicle driving pattern, and the first vehicle driving pattern and the second vehicle driving pattern may be different from each other.

An autonomous driving simulation device 120 or the vehicle driving pattern analysis device 110 can reflect the actual environment of roads by applying speed values according to vehicle proportions to the traffic volume in a simulation by utilizing the generated vehicle driving patterns for each of the plurality of areas. According to an example, the autonomous driving simulation device 120 or the vehicle driving pattern analysis device 110 may simulate vehicles in each area to drive in each area of a virtual space corresponding to the actual road based on the generated vehicle driving patterns for each of the plurality of areas. The simulation may be an autonomous driving simulation for an ego-vehicle.

As described above, the vehicle driving pattern analysis device 110 in accordance with an example of the present disclosure can generate vehicle driving patterns for each of a plurality of areas within actual roads based on the actual driving data 112 and the map data 114 or 116, and can support to implement a digital twin that reflects a more accurate and diverse actual environment by performing an autonomous driving simulation associated with the actual roads based on the generated vehicle driving patterns for each of the plurality of areas.

Figure 2:
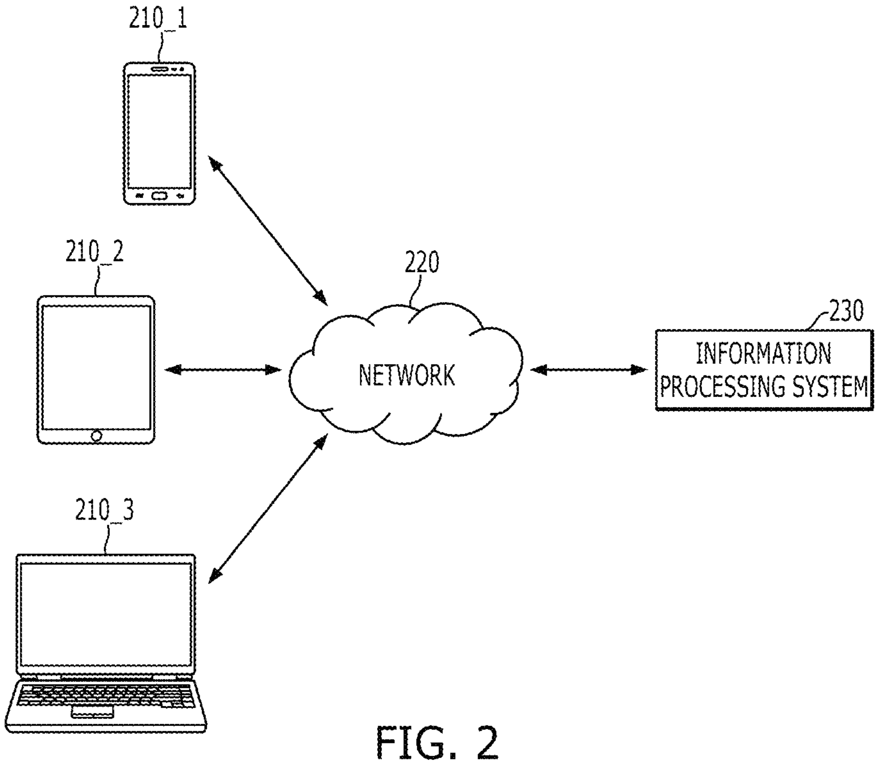
FIG. 2 is a schematic diagram of a configuration in which an information processing system is communicatively connected to a plurality of user terminals in relation to data processing.

FIG. 2 is a schematic diagram of a configuration in which an information processing system 230 is communicatively connected to a plurality of user terminals 210_1, 210_2 and 210_3 in relation to data processing.

Referring to FIG. 2, the information processing system 230 may include a system(s) that can provide a data processing service (e.g., a vehicle driving pattern analysis service). The information processing system 230 may include one or more server devices and/or databases, or one or more distributed computing devices and/or distributed databases based on cloud computing services, which are capable of storing, providing and executing computer-executable programs (e.g., downloadable applications) and data relating to a data processing service. For example, the information processing system 230 may include separate systems (e.g., servers) for the data processing service.

The data processing service which is provided by the information processing system 230, may be provided to the user via a data processing application, a web browser application, and the like installed in each of a plurality of user terminals 210_1, 210_2, and 210_3.

A plurality of user terminals 210_1, 210_2, and 210_3 may communicate with the information processing system 230 through a network 220. The network 220 may be configured to enable communication between a plurality of user terminals 210_1, 210_2, and 210_3 and the information processing system 230. The network 220 may be configured as a wired network such as Ethernet, a wired home network (Power Line Communication), a telephone line communication device and RS-serial communication, a wireless network such as a mobile communication network, a wireless LAN (WLAN), Wi-Fi, Bluetooth, and ZigBee, or a combination thereof, depending on the installation environment. The method of communication is not limited, and may include a communication method using a communication network (e.g., mobile communication network, wired Internet, wireless Internet, broadcasting network, satellite network, and so on) that may be included in the network 220 as well as short-range wireless communication between the user terminals 210_1, 210_2, and 210_3.

For example, the plurality of user terminals 210_1, 210_2 and 210_3 may transmit a data processing request and a command associated with a user request for data processing to the information processing system 230 through the network 220, and the information processing system 230 may receive the request and the command.

In FIG. 2, a mobile phone terminal 210_1, a tablet terminal 210_2, and a PC terminal 210_3 are illustrated as the examples of the user terminals, but aspects are not limited thereto, and the user terminals 210_1, 210_2 and 210_3 may be any computing device that is capable of wired and/or wireless communication and that can be installed with the data processing application, and so on and execute the same. For example, the user terminal may include a smartphone, a mobile phone, a navigation system, a computer, a notebook computer, a digital broadcasting terminal, Personal Digital Assistants (PDA), a Portable Multimedia Player (PMP), a tablet PC, a game console, a wearable device, an internet of things (IoT) device, a virtual reality (VR) device, an augmented reality (AR) device, and the like. In addition, FIG. 2 illustrates that three user terminals 210_1, 210_2, and 210_3 are in communication with the information processing system 230 through the network 220, but aspects are not limited thereto, and a different number of user terminals may be configured to be in communication with the information processing system 230 through the network 220.

If an information processing system 230 provides a vehicle driving pattern analysis service, it may receive a plurality of actual driving data (e.g., 112 in FIG. 1), road map data (e.g., 114 in FIG. 1), or satellite map data (e.g., 116 in FIG. 1) from user terminals 210_1, 210_2, and 210_3. In this case, the information processing system 230 may obtain actual driving data of a vehicle driving on an actual road within a desired zone based on the plurality of actual driving data, road map data, or satellite map data, and generate vehicle driving patterns for each of a plurality of areas based on the obtained actual driving data.

For example, the information processing system 230 may set a region of interest in which the vehicle is driving in the road map data or satellite map data received from the user terminals 210_1, 210_2, and 210_3, and obtain location-based first actual driving data from the received actual driving data based on the set region of interest. The information processing system 230 may perform denoising on the obtained first actual driving data, generate a first cluster and a second cluster by performing clustering on the denoised first actual driving data, generate vehicle driving patterns associated with a first area based on the data included in the first cluster, and generate vehicle driving patterns associated with a second area based on the data included in the second cluster. Thereafter, the information processing system 230 may transmit the generated vehicle driving patterns to the user terminals 210_1, 210_2, and 210_3.

Figure 3:
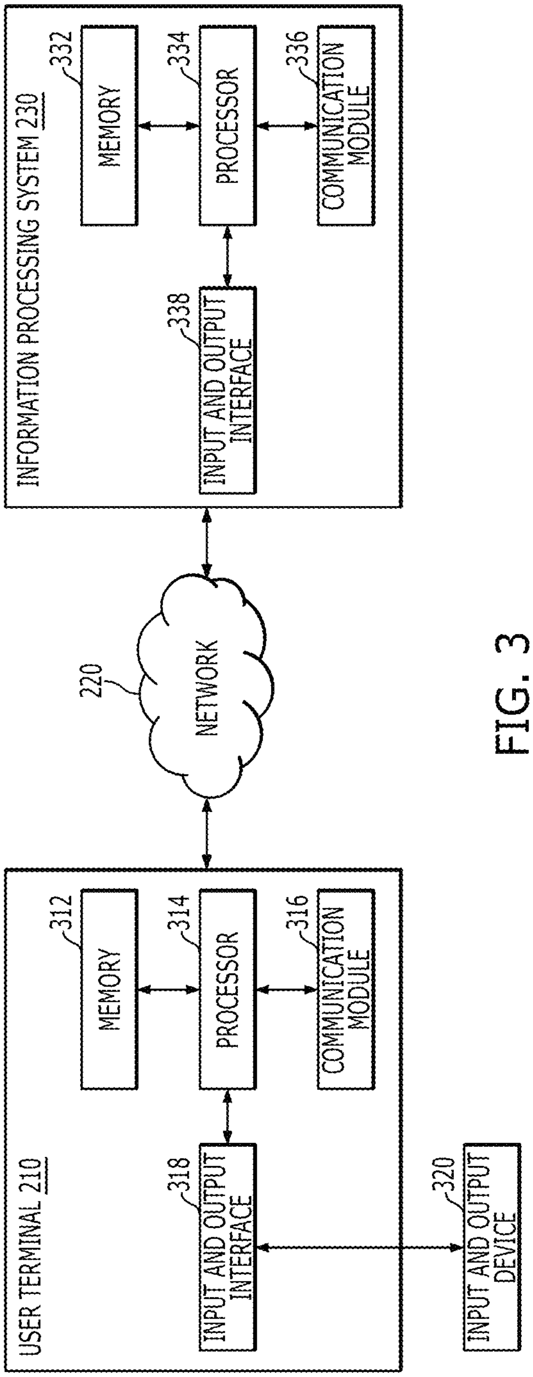
FIG. 3 is a block diagram of an internal configuration of a user terminal and an information processing system.

FIG. 3 is a block diagram of an internal configuration of a user terminal 210 and an information processing system 230.

The user terminal 210 may refer to any computing device that is capable of executing the data processing application and so on and also capable of wired/wireless communication, and may include the mobile phone terminal 210_1, the tablet terminal 210_2, the PC terminal 210_3, and the like of FIG. 2, for example. As illustrated, the user terminal 210 may include a memory 312, a processor 314, a communication module 316, and an input and output interface 318. Likewise, the information processing system 230 may include a memory 332, a processor 334, a communication module 336, and an input and output interface 338. As illustrated in FIG. 3, the user terminal 210 and the information processing system 230 may be configured to communicate information and/or data through the network 220 using the respective communication modules 316 and 336. In addition, an input and output device 320 may be configured to input information and/or data to the user terminal 210 or to output information and/or data generated from the user terminal 210 through the input and output interface 318.

The memories 312 and 332 may include any non-transitory computer-readable recording medium. The memories 312 and 332 may include a permanent mass storage device such as random access memory (RAM), read only memory (ROM), disk drive, solid state drive (SSD), flash memory, and so on. As another example, a non-destructive mass storage device such as ROM, SSD, flash memory, disk drive, and so on may be included in the user terminal 210 or the information processing system 230 as a separate permanent storage device that is separate from the memory. In addition, an operating system and at least one program code (e.g., a code for an application associated with a data processing service and the like) may be stored in the memories 312 and 332.

These software components may be loaded from a computer-readable recording medium separate from the memories 312 and 332. Such a separate computer-readable recording medium may include a recording medium directly connectable to the user terminal 210 and the information processing system 230, and may include a computer-readable recording medium such as a floppy drive, a disk, a tape, a DVD/CD-ROM drive, a memory card, and so on, for example. As another example, the software components may be loaded into the memories 312 and 332 through the communication modules 316 and 336 rather than the computer-readable recording medium. For example, one or more programs may be loaded into the memories 312 and 332 based on a computer program (e.g., application associated with data processing service and the like) that is installed by the files provided by the developers or a file distribution system for distributing an installation file of the application through the network 220.

The processors 314 and 334 may be configured to process the instructions of the computer program by performing basic arithmetic, logic, and input and output operations. The instructions may be provided to the processors 314 and 334 from the memories 312 and 332 or the communication modules 316 and 336. For example, the processors 314 and 334 may be configured to execute the received instructions according to a program code stored in a recording device such as the memories 312 and 332.

The communication modules 316 and 336 may provide a configuration or function for the user terminal 210 and the information processing system 230 to communicate with each other through the network 220, and may provide a configuration or function for the user terminal 210 and/or the information processing system 230 to communicate with another user terminal or another system (e.g., a separate cloud system or the like). For example, a request or data (e.g., a request to process data or data, and the like) generated by the processor 314 of the user terminal 210 according to the program code stored in the recording device such as the memory 312 or the like may be transmitted to the information processing system 230 through the network 220 under the control of the communication module 316. Conversely, a control signal or a command provided under the control of the processor 334 of the information processing system 230 may be received by the user terminal 210 through the communication module 316 of the user terminal 210 through the communication module 336 and the network 220.

The input and output interface 318 may be a means for interfacing with the input and output device 320. As an example, the input device may include a device such as a camera including an audio sensor and/or an image sensor, a keyboard, a microphone, a mouse, and so on, and the output device may include a device such as a display, a speaker, a haptic feedback device, and so on. As another example, the input and output interface 318 may be a means for interfacing with a device such as a touch screen or the like that integrates a configuration or function for performing inputting and outputting. While FIG. 3 illustrates that the input and output device 320 is not included in the user terminal 210, aspects are not limited thereto, and the input and output device 320 may be configured as one device with the user terminal 210. In addition, the input and output interface 338 of the information processing system 230 may be a means for interfacing with a device (not illustrated) for inputting or outputting that may be connected to, or included in the information processing system 230. While FIG. 3 illustrates the input and output interfaces 318 and 338 as the components configured separately from the processors 314 and 334, aspects are not limited thereto, and the input and output interfaces 318 and 338 may be configured to be included in the processors 314 and 334.

The user terminal 210 and the information processing system 230 may include more than those components illustrated in FIG. 3. Meanwhile, most of the related components may not necessarily require exact illustration. The user terminal 210 may be implemented to include at least a part of the input and output device 320 described above. In addition, the user terminal 210 may further include other components such as a transceiver, a Global Positioning System (GPS) module, a camera, various sensors, a database, and the like. For example, if the user terminal 210 is a smartphone, it may generally include components included in the smartphone, and for example, it may be implemented such that various components such as an acceleration sensor, a gyro sensor, a microphone module, a camera module, various physical buttons, buttons using a touch panel, input and output ports, a vibrator for vibration, and so on are further included in the user terminal 210.

The processor 314 of the user terminal 210 may be configured to operate the data processing application (e.g., an application for providing a vehicle driving pattern analysis service) or the web browser application for providing the data processing service. A program code associated with the above application may be loaded into the memory 312 of the user terminal 210. While the application is running, the processor 314 of the user terminal 210 may receive information and/or data provided from the input and output device 320 through the input and output interface 318 or receive information and/or data from the information processing system 230 through the communication module 316, and process the received information and/or data and store it in the memory 312. In addition, such information and/or data may be provided to the information processing system 230 through the communication module 316.

While the data processing application is running, the processor 314 may receive voice data, text, image, video, and the like input or selected through the input device such as a camera, a microphone, and the like that includes a touch screen, a keyboard, an audio sensor and/or an image sensor connected to the input and output interface 318, and store the received voice data, text, image, and/or video or the like in the memory 312, or provide it to the information processing system 230 through the communication module 316 and the network 220. The processor 314 may receive a user input inputted through the input device and provide data/request corresponding to the user input to the information processing system 230 through the network 230 and the communication module 316.

The processor 314 of the user terminal 210 may transmit and output the information and/or data to the input and output device 320 through the input and output interface 318. For example, the processor 314 of the user terminal 210 may output the processed information and/or data through the output device 320 such as a device capable of outputting a display (e.g., a touch screen, a display, and the like), a device capable of outputting a voice (e.g., speaker), and the like.

The processor 334 of the information processing system 230 may be configured to manage, process, and/or store information and/or data received from a plurality of user terminals 210 and/or a plurality of external systems. The information and/or data processed by the processor 334 may be provided to the user terminals 210 through the communication module 336 and the network 220.

The information processing system 230 is shown as a single system in FIG. 3 but is not limited thereto, and may be formed of a plurality of systems/servers for providing various services associated with a digital twin virtual environment. For example, the information processing system 230 may include a separate server including an autonomous vehicle simulation model of a digital twin virtual environment, etc. The autonomous vehicle simulation model of the digital twin virtual environment may be, for example, a model that allows an autonomous driving simulation for an ego-vehicle to be performed in a virtual space corresponding to an actual road within a first zone based on the vehicle driving patterns for each of the plurality of areas generated by the information processing system 230.

Figure 4:
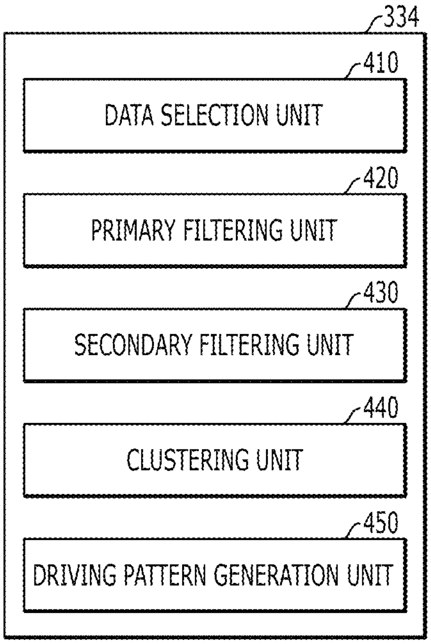
FIG. 4 is a diagram for describing the configuration of a processor of the information processing system in accordance with an example of the present disclosure.

FIG. 4 is a diagram for describing the configuration of a processor 334 of the information processing system in accordance with an example of the present disclosure.

Referring to FIG. 4, the processor 334 of the information processing system may include a data selection unit 410, a primary filtering unit 420, a secondary filtering unit 430, a clustering unit 440, and a driving pattern generation unit 450. In FIG. 4, the respective components of the processor 334 represent functional elements that are functionally distinct, and may be implemented in a form in which a plurality of components is integrated with each other in an actual physical environment. In another example, the respective components of the information processing system 230 may be implemented separately from each other in an actual physical environment. Further, the information processing system 230 in FIG. 4 is implemented by being divided into the data selection unit 410, the primary filtering unit 420, the secondary filtering unit 430, the clustering unit 440, and the driving pattern generation unit 450 but is not limited thereto, and some components may be omitted or other components may be added. Moreover, at least one of the data selection unit 410, the primary filtering unit 420, the secondary filtering unit 430, the clustering unit 440, and the driving pattern generation unit 450 in FIG. 4 may be implemented in the form of instructions stored in a memory 332.

According to an example, the data selection unit 410 may obtain first actual driving data associated with a first plurality of vehicles driving on actual roads within a first zone based on inputted actual driving data (e.g., 112 in FIG. 1) and map data (e.g., 114 and/or 116 in FIG. 1). For example, the actual driving data 112 may utilize a partial dataset of Main and Stadium Intersection provided by Ann Arbor Intersection Trajectory Data. The data selection unit 410 may select the first actual driving data of the first plurality of vehicles driving in various directions, such as going straight, turning left, turning right, and making a U-turn, in a particular lane within a particular area of the intersection from this dataset based on location.

Figure 5:
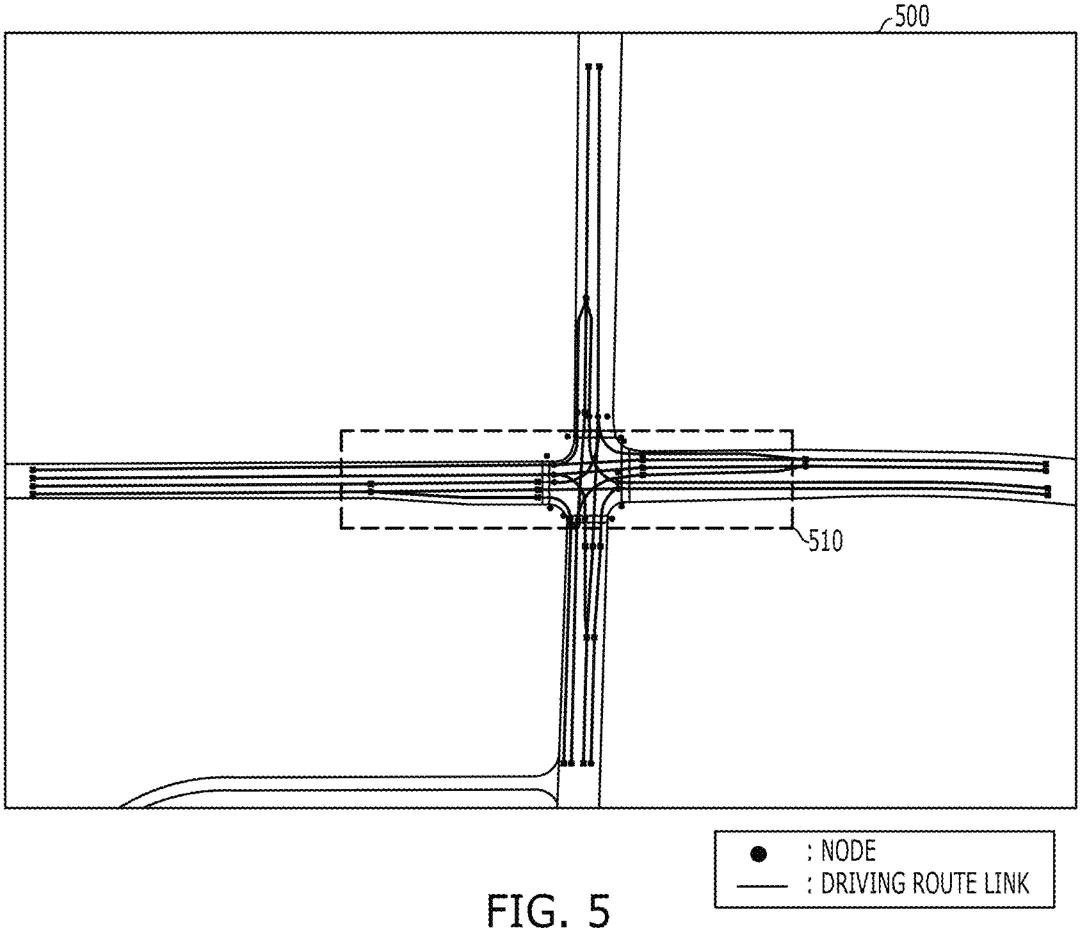
FIG. 5 is a diagram showing an example of a method of obtaining first actual driving data using road map data including driving route links and nodes.

FIG. 5 is a diagram showing an example of a method of obtaining first actual driving data using road map data including driving route links and nodes.

Referring to FIG. 5, the data selection unit 410 may receive road map data (e.g., 114 in FIG. 1) and actual driving data (e.g., 112 in FIG. 1) associated with a second zone 500 including a first zone 510. The received road map data may include a plurality of vertices, a plurality of driving route links, and a plurality of nodes, and each vertex may have a coordinate value and an attribute value. The data selection unit 410 may obtain second actual driving data associated with a second plurality of vehicles driving on actual roads within the second zone 500 from the received actual driving data. The data selection unit 410 may select, automatically or by a user command, routes within the road map data along which the first plurality of vehicles can travel based on the plurality of driving route links, and set the first zone 510 including the selected routes as a region of interest (ROI). The data selection unit 410 may extract the first actual driving data associated with the region of interest from the second actual driving data based on location (e.g., based on GPS coordinates). Thereby, the data selection unit 410 may obtain the first actual driving data associated with the first plurality of vehicles driving on actual roads within the first zone.

The first zone 510, i.e., the region of interest, in FIG. 5 may be a region set to extract the location coordinates of a vehicle going straight in a particular lane within a particular area of an intersection. The region of interest may include a plurality of areas in which vehicle driving patterns are generated.

Figure 6:
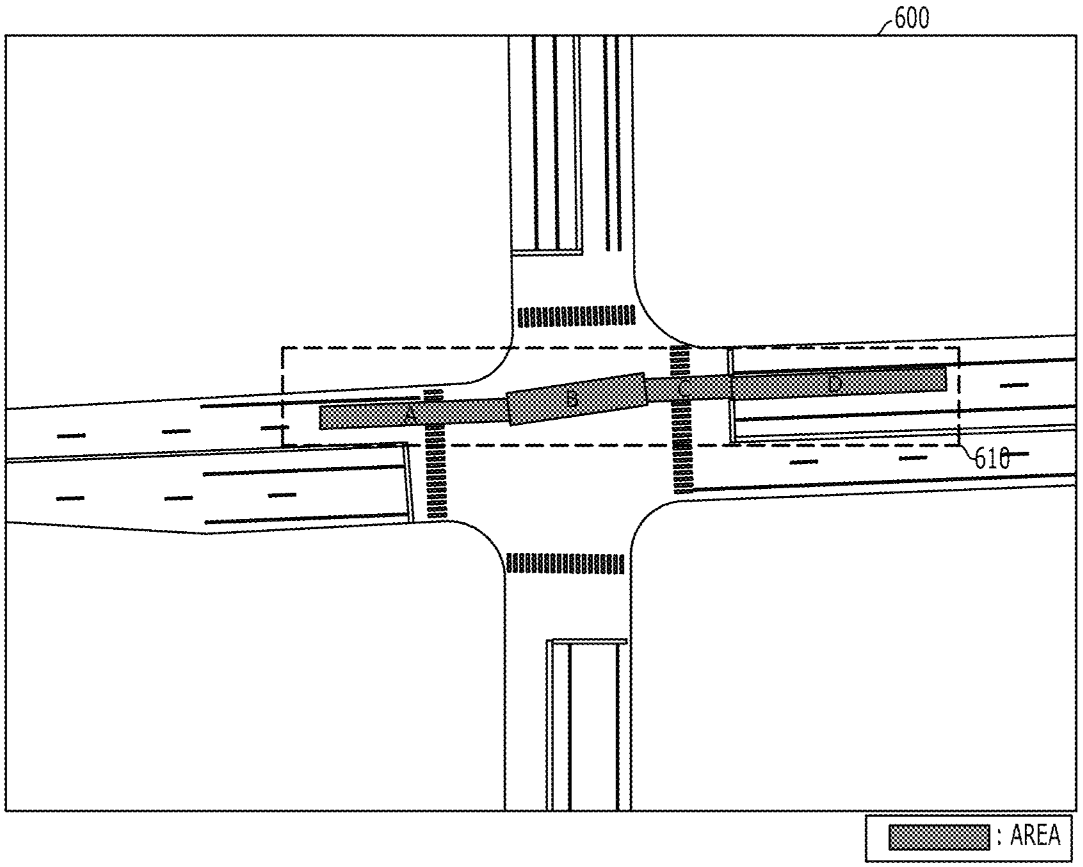
FIG. 6 is a diagram showing an example of a method of obtaining first actual driving data using satellite map data.

FIG. 6 is a diagram showing an example of a method of obtaining first actual driving data using satellite map data.

Referring to FIG. 6, the data selection unit 410 may receive satellite map data (e.g., the satellite map data 116 in FIG. 1) and actual driving data (e.g., the actual driving data 112 in FIG. 1) associated with a second zone 600 including a first zone 610. The data selection unit 410 may obtain second actual driving data associated with a second plurality of vehicles driving on actual roads within the second zone 600 from the received actual driving data. The data selection unit 410 may receive information on at least one region including lanes on the satellite map data from a user via the input/output interface 318 or 338, and set the at least one region as regions of interest A to D. The region of interest may be the same as the first zone 610 or may be included in the first zone 610, and the region of interest may include a plurality of areas A to D in which vehicle driving patterns are generated. In the following, at least one region of interest and a plurality of areas A to D can be used interchangeably.

The data selection unit 410 may extract the first actual driving data associated with the at least one region of interest, i.e., the plurality of areas A to D, from the second actual driving data based on location (e.g., based on GPS coordinates). Thereby, the data selection unit 410 may obtain the first actual driving data associated with the first plurality of vehicles driving on actual roads within the first zone. The first zone 610, i.e., the plurality of areas A to D, in FIG. 6 may be a region set to extract the location coordinates of a vehicle going straight in a particular lane within a particular area of an intersection, and the driving direction may be a direction moving from D to A.

If the first actual driving data selected for each region of interest set in FIG. 6 is statistically analyzed, the values are distributed as in [Table 1].

TABLE 1

| | Area A | Area B | Area C | Area D |
|---|---|---|---|---|
| Min | 1.466 | 1.491 | 0 | 0 |
| 1Q | 4.973 | 4.380 | 1.061 | 0.016 |
| Median | 5.807 | 4.935 | 3.226 | 0.126 |
| Mean | 5.716 | 5.126 | 2.989 | 0.697 |
| 3Q | 6.568 | 5.758 | 4.335 | 0.469 |
| Max | 10.009 | 9.532 | 9.176 | 14.163 |
| N | 1846 | 1216 | 1167 | 15800 |

In [Table 1], Area A to Area D are the regions of interest A to D shown in FIG. 6, and Min, 1Q, Median, Mean, 3Q, Max, and N are statistical values of the first actual driving data. Specifically, Min denotes the minimum of the dataset consisting of the first actual driving data, 1Q denotes the median between the minimum and the median of the dataset, Median denotes the median of the dataset, Mean denotes the mean of the dataset, 3Q denotes the median between the median and the maximum of the dataset, Max denotes the maximum of the dataset, and N denotes the number of data points in the dataset.

Figure 7:
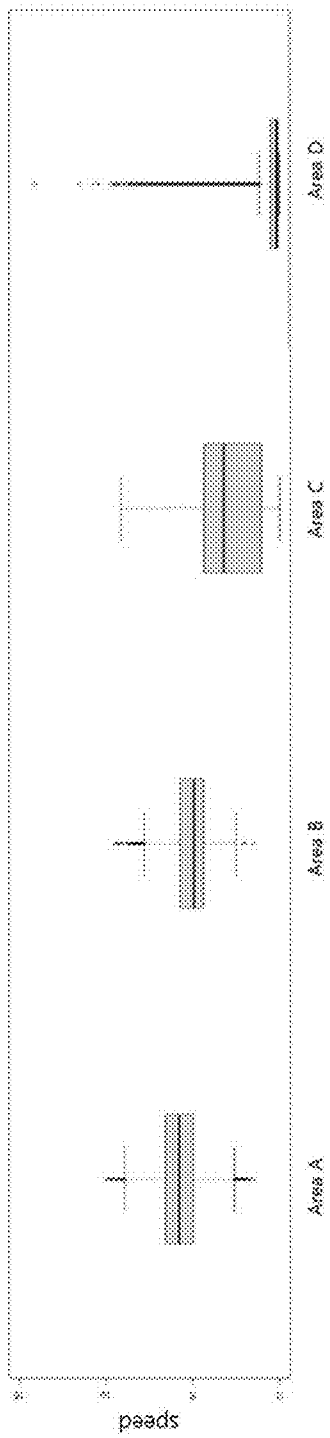
FIG. 7 is a diagram showing an example of a pattern of the first actual driving data for each region of interest set in FIG. 6.

FIG. 7 is a diagram showing an example of a pattern of the first actual driving data for each region of interest set in FIG. 6. From the statistical results of [Table 1], a pattern of increasing speed can be observed while the first plurality of vehicles passes through the intersection, as shown in FIG. 7. A specific driving pattern of a vehicle according to speed can be analyzed through clustering, which will be described later.

Referring again to FIG. 4, according to an example, the primary filtering unit 420 may perform primary filtering on the first actual driving data selected by the data selection unit 410 based on the heading data. The primary filtering unit 420 may filter using [Mathematical Expression 1].

$$|X - \text{median}(X)| > k \times SD(X) \quad \text{[Mathematical Expression 1]}$$

In [Mathematical Expression 1], X is a direction value, k is a multiple of the standard deviation, and SD (X) is the standard deviation of the variable X. The primary filtering unit 420 may filter based on the standard deviation of the statistical values of the first actual driving dataset using [Mathematical Expression 1]. For example, the primary filtering unit 420 may receive as input the first actual driving data extracted based on the location (e.g., based on the GPS coordinates) by the data selection unit 410, and perform primary filtering on the data that falls within 1SD of the median or mean of the heading data out of the inputted first actual driving data.

According to an example, the secondary filtering unit 430 may perform secondary filtering by performing linear regression analysis on the first actual driving data that has been subjected to the primary filtering. The secondary filtering unit 430 may filter using [Mathematical Expression 2] and [Mathematical Expression 3].

$$|Y - Y'| > SD(Y) \quad \text{[Mathematical expression 2]}$$

$$Y' = B_0 + B_1 X \quad \text{[Mathematical expression 3]}$$

In [Mathematical Expression 2] and [Mathematical Expression 3], Y is the actual latitude value, Y' is the latitude value predicted using [Mathematical Expression 3], $B_0$ is the intercept, $B_1$ is the coefficient, and X is the longitude coordinate. For example, the secondary filtering unit 430 may perform secondary filtering on the data of a linear pattern out of the first actual driving data by applying the linear regression of [Mathematical Expression 2] to the first actual driving data that has been subjected to the primary filtering. Thereby, the data of the driving direction to be obtained from the first actual driving data can be selected, and the rest can be removed as noise.

[Mathematical Expression 1] to [Mathematical Expression 3] described above are for obtaining data of going straight through an intersection out of the first actual driving data, and can remove data such as right turns or the like. Data on vehicles turning left or right may be obtained by changing the conditions.

Figure 8:
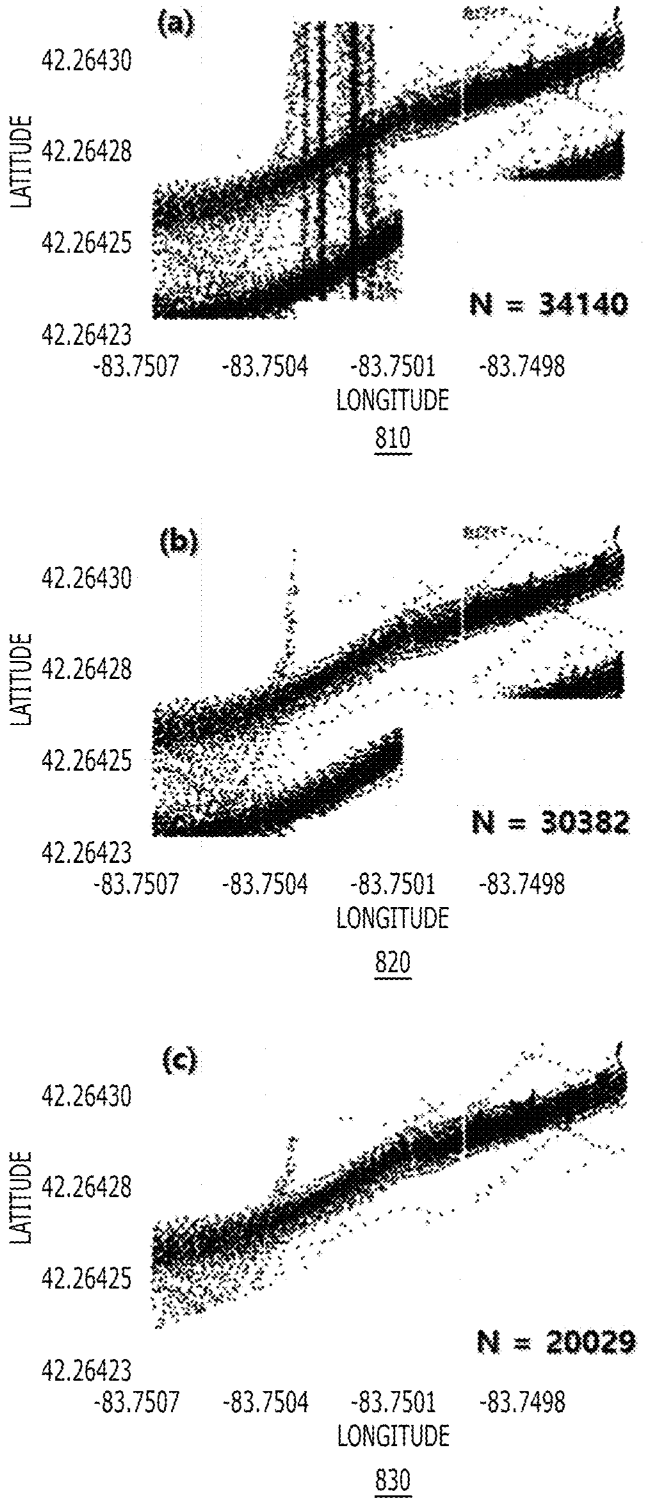
FIG. 8 is a diagram showing an example of a data selection result, a primary filtering result, and a secondary filtering result.

FIG. 8 is a diagram showing an example of a data selection result 810, a primary filtering result 820, and a secondary filtering result 830.

Referring to FIG. 8, in one example, the data selection unit 410 may select 34,140 pieces of first actual driving data associated with the region of interest through coordinate-based extraction from the actual driving data 112. The primary filtering unit 420 may obtain 30,382 pieces of first actual driving data by performing primary filtering on the 34,140 pieces of first actual driving data based on heading data within 1SD. The secondary filtering unit 430 may obtain 20,029 pieces of first actual driving data by applying linear regression analysis to the 30,382 pieces of first actual driving data.

Referring again to FIG. 4, according to an example, the clustering unit 440 may generate a plurality of clusters (e.g., a first cluster and a second cluster) by performing clustering on the first actual driving data denoised by the secondary filtering unit 430.

For example, the clustering unit 440 may generate a plurality of cluster candidates by applying a K-means cluster analysis technique to the denoised first actual driving data (e.g., data of going straight). At this time, the clustering unit 440 may generate a plurality of cluster candidates by performing clustering using the speed data of the denoised first actual driving data. The clustering unit 440 may determine cluster candidates having a dispersion uniformity greater than or equal to a preset threshold (e.g., 90%) out of the generated plurality of cluster candidates as the first cluster and the second cluster.

The clustering unit 440 may analyze the cluster dispersion uniformity using the total sum of squares (TSS) and the within-cluster sum of squares (WCSS). TSS is the sum of the squared distances of all data points in the dataset (the denoised first actual driving data), and measures data dispersion. WCSS is the sum of the squared distances between data points in each cluster, and measures the data aggregation within each cluster. Therefore, TSS represents the overall variability of the data, and WCSS represents the degree to which the data within each cluster are clustered around the corresponding cluster center during the clustering process. This can be used as a relative measure showing how closely the data points in each cluster are clustered around the corresponding cluster center. The clustering unit 440 may select clusters with a dispersion uniformity of 90% or higher as the minimum number, and the cluster analysis results associated therewith are as shown in [Table 2].

TABLE 2

| Number of Cluster | Area A | Area B | Area C | Area D |
|---|---|---|---|---|
| 3 | 79.7% | 79.3% | 87.6% | 89.5% |
| 4 | 88.5% | 88.3% | 93.1% | 93.8% |
| 5 | 92.3% | 92.1% | 96.2% | 95.6% |
| 6 | 94.8% | 94.3% | 97.6% | 96.7% |
| 7 | 95.8% | 95.5% | 98.2% | 97.7% |
| 8 | 96.7% | 96.6% | 98.4% | 98.2% |

[Table 2] shows the WCSS results of a plurality of clusters including the first and second clusters for each of the plurality of areas A to D. For example, for area A, data from clusters 5 to 8 with a dispersion uniformity of 90% or higher may be selected as the result of the clustering analysis and then used for vehicle driving pattern analysis.

When the plurality of clusters including the first and second clusters are determined, the clustering unit 440 may average the speed data for each cluster. The clustering unit 440 may generate speed data statistical values for each cluster (e.g., each of the first and second clusters). For example, the clustering unit 440 may generate the mean of the speed data of the first cluster and the mean of the speed data of the second cluster as the speed data statistical values for each cluster.

Figure 9:
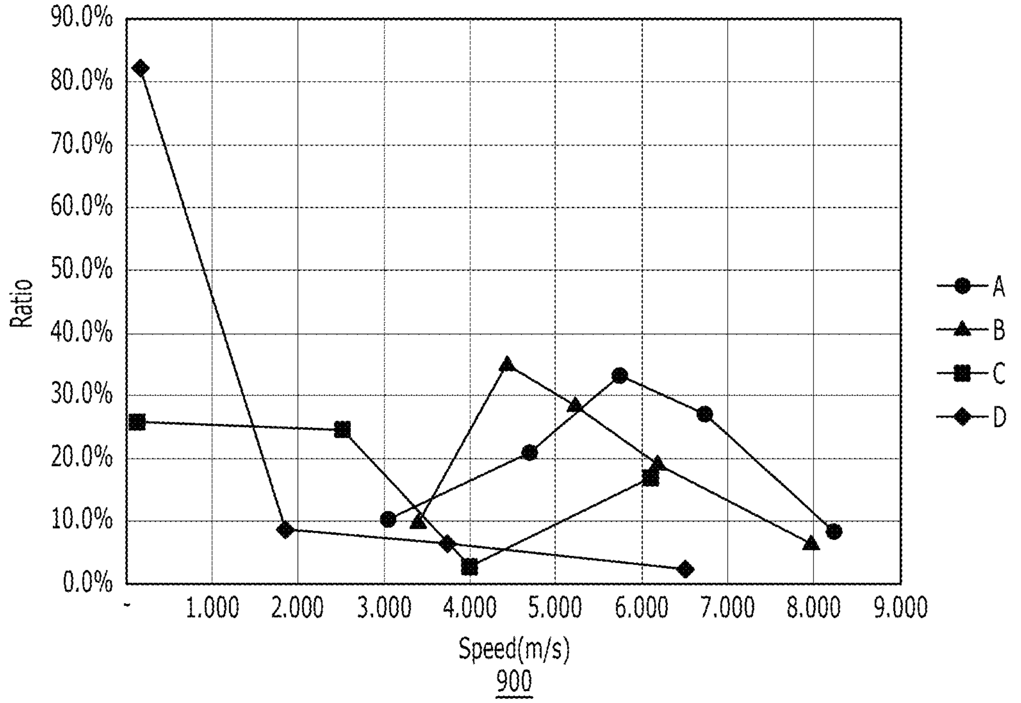
FIG. 9 is a view showing an example of a speed ratio graph for each of a plurality of areas.

FIG. 9 is a view showing an example of a speed ratio graph 900 for each of a plurality of areas A to D.

In FIG. 9, the x-axis represents the mean of speed data (Speed) calculated for each cluster, and the y-axis represents the ratio of the clusters (Ratio). In areas C and D, a large amount of stop data with speed=0 is observed due to the stop signal at the intersection. In particular, area D mainly shows a pattern in which the first plurality of vehicles stops or decelerates.

Referring again to FIG. 4, according to an example, the driving pattern generation unit 450 may generate vehicle driving patterns for each of the plurality of areas based on the clustering analysis results of the clustering unit 440. The vehicle driving patterns for each of the plurality of areas including the first and second areas are patterns regarding whether the driving speed of the vehicle increases or decreases in each area. A particular area of the plurality of areas may include a first vehicle driving pattern and a second vehicle driving pattern, and the first vehicle driving pattern and the second vehicle driving pattern may be different from each other. According to an example, the driving pattern generation unit 450 may generate a first vehicle driving pattern associated with the first area based on the data included in the first cluster. Further, the driving pattern generation unit 450 may generate a second vehicle driving pattern associated with the second area based on the data included in the second cluster.

Figure 10:
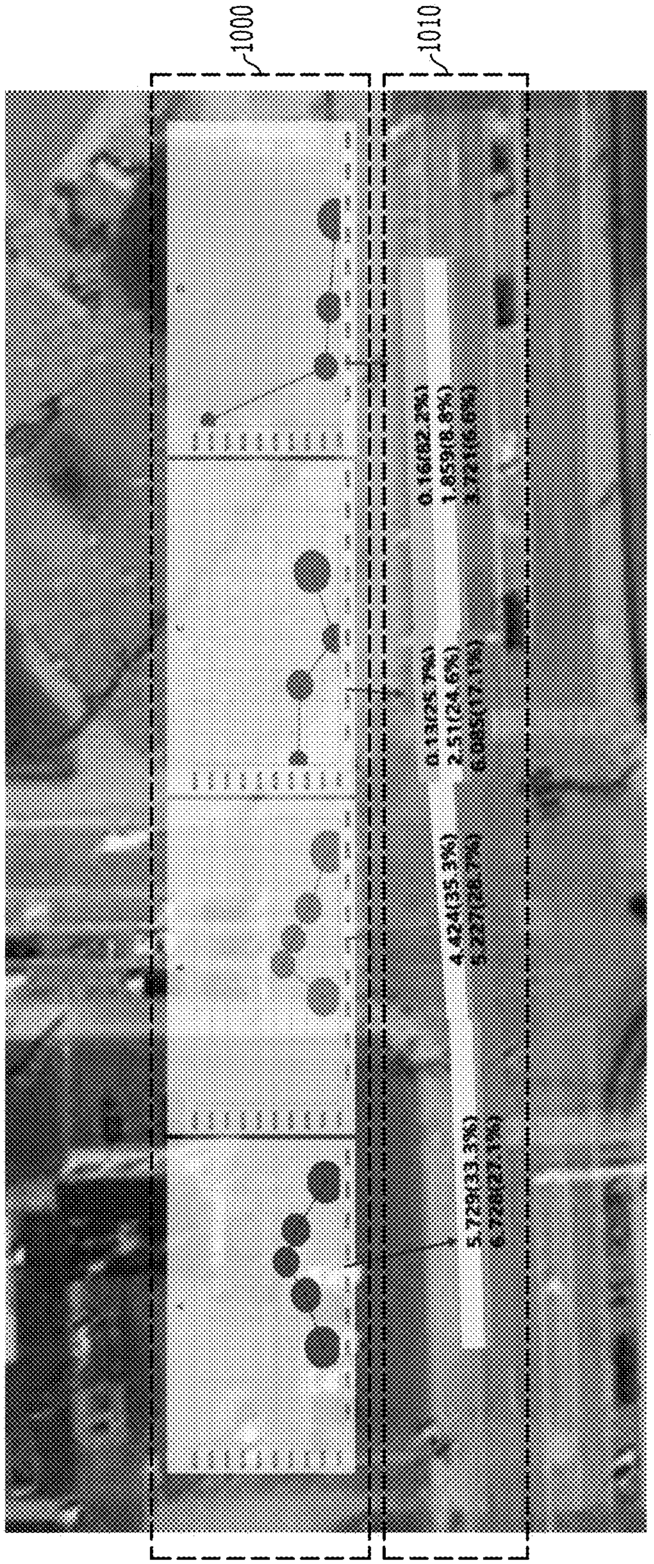
FIG. 10 is a view showing an example of vehicle driving patterns.

FIG. 10 is a view showing an example of vehicle driving patterns.

Referring to FIG. 10, the driving pattern generation unit 450 may generate vehicle driving patterns for each of a plurality of areas by analyzing the speed ratio graph 1000 described with reference to FIG. 9. In the graph 1000, the x-axis represents the speed, the y-axis represents the ratio of the clusters, and the size of the circle represents the deviation of the cluster. The driving pattern generation unit 450 may select n speed data statistical values (e.g., the mean of speed data) representing a significant proportion (e.g., a large proportion) for each of the plurality of areas A to D. Here, n is an integer greater than or equal to 1. The driving pattern generation unit 450 may select the next highest data, excluding the cluster with speed=0, which indicates a stationary situation. As one example, the driving pattern generation unit 450 may select two values that represent a high proportion out of the speed data statistical values (e.g., the mean of the speed data) calculated for each cluster corresponding to the plurality of areas A to D (1010). For FIG. 10, 1.859 m/s and 3.721 m/s are selected for area D, and 2.51 m/s and 6.085 m/s are selected for area C.

The driving pattern generation unit 450 may generate a vehicle driving pattern in which the vehicle passing through the intersection passes through area D at 1.859 m/s before entering the intersection, accelerates to 4.424 m/s in area B, and further increases to 5.729 m/s in area A where the vehicle leaves the intersection by analyzing the selected data. Further, the driving pattern generation unit 450 may generate a vehicle driving pattern in which the vehicle passing through the intersection passes through area D at 3.721 m/s before entering the intersection, accelerates to 5.227 m/s in area B, and further increases to 6.728 m/s in area A where the vehicle leaves the intersection.

Figure 11:
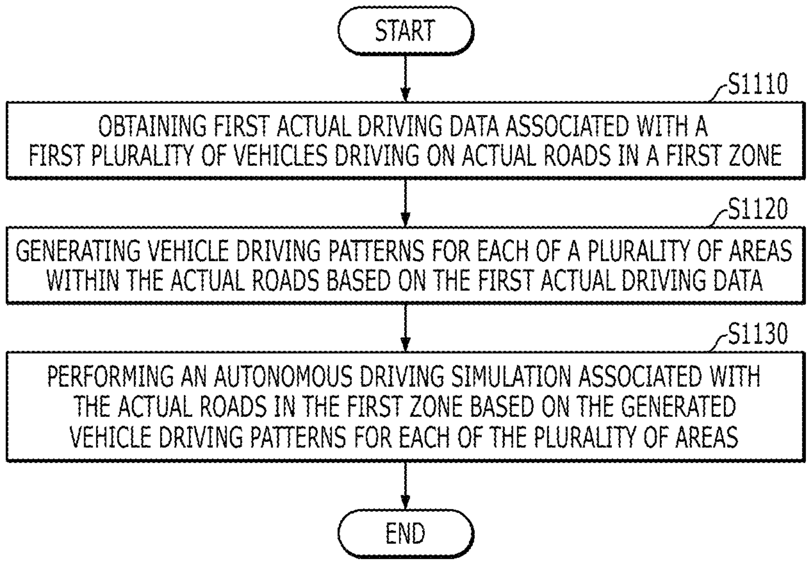
FIG. 11 is a diagram for describing a method for analyzing vehicle driving patterns in accordance with an example of the present disclosure.

FIG. 11 is a diagram for describing a method for analyzing vehicle driving patterns in accordance with an example of the present disclosure.

Referring to FIG. 11, an electronic device (e.g., the vehicle driving pattern analysis device 110 of FIG. 1 or the information processing system 230 of FIG. 3, or at least one processor thereof) that analyzes vehicle driving patterns may obtain first actual driving data associated with a first plurality of vehicles driving on actual roads within a first zone out of actual driving data based on the inputted actual driving data and map data (road map data or satellite map data) in step 1110 (S1110). The road map data and the satellite map data may be map data including roads in a particular zone (e.g., the first zone 510 and the second zone 500 of FIG. 5 or the first zone 610 and the second zone 600 of FIG. 6). According to an example, when the first zone is set as a region of interest in the map data, the electronic device may obtain first actual driving data associated with the first plurality of vehicles driving on actual roads in the set first zone from the inputted actual driving data. The first actual driving data may include speed data, heading data, and location data of the vehicles.

In step 1120 (S1120), the electronic device may generate vehicle driving patterns for each of a plurality of areas within actual roads based on the obtained first actual driving data. According to an example, the electronic device may perform denoising on the first actual driving data. The electronic device may select data within a reference value (e.g., 1SD of the median or mean of the heading data) by primary filtering in order to maintain the consistency of the heading data of the first actual driving data. Then, the vehicle driving pattern analysis device 110 may perform secondary filtering by applying linear regression analysis to the first actual driving data that has been subjected to the primary filtering. Thereby, the electronic device may select the first actual driving data of the vehicles driving in the same direction (e.g., a direction set manually or automatically out of a straight drive, a left turn, a right turn, and a U-turn) out of the first plurality of vehicles, and remove the rest of the data as noise.

According to an example, the electronic device may generate a plurality of clusters including first and second clusters by performing clustering on the denoised first actual driving data, and generate vehicle driving patterns for each of the plurality of areas set in the map data by calculating the speed data statistical values and ratios of each cluster. The vehicle driving patterns for each of the plurality of areas are patterns regarding whether the driving speed of the vehicle increases or decreases in each area. A particular area of the plurality of areas may include a first vehicle driving pattern and a second vehicle driving pattern, and the first vehicle driving pattern and the second vehicle driving pattern may be different from each other.

In step 1130 (S1130), the electronic device can reflect the actual environment of roads by applying speed values according to vehicle proportions to the traffic volume in a simulation (e.g., an autonomous driving simulation for an ego-vehicle) by utilizing the generated vehicle driving patterns for each of the plurality of areas. According to an example, the electronic device can simulate the ego-vehicle and neighboring vehicles to drive based on the vehicle driving patterns for each area in each area of a virtual space corresponding to an actual road.

The flowchart and description above are merely examples and may be implemented differently in some examples. For example, in some examples, the order of respective steps may be changed, some steps may be repeatedly performed, some steps may be omitted, or some steps may be added.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, etc. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, etc. The instructions may be executable by one or more processors, and may cause the processor(s) to perform certain aspects of the functions described in the present disclosure.

When implemented in software, the techniques may be stored on a computer-readable medium as one or more instructions or codes, or may be transmitted through a computer-readable medium. The computer-readable media include both the computer storage media and the communication media including any medium that facilitates the transmission of a computer program from one place to another. The storage media may also be any available media that may be accessible to a computer. By way of non-limiting example, such a computer-readable medium may include RAM, ROM, EEPROM, CD-ROM or other optical disk storage, magnetic disk storage or other magnetic storage devices, or any other media that can be used to transmit or store desired program code in the form of instructions or data structures and can be accessible to a computer. In addition, any connection is properly referred to as a computer-readable medium.

For example, if the software is sent from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer-readable media.

The software module may reside in RAM memory, flash memory, ROM memory, EPROM memory, EEPROM memory, registers, hard disk, removable disk, CD-ROM, or any other form of storage medium known. An exemplary storage medium may be connected to the processor such that the processor may read or write information from or to the storage medium. Alternatively, the storage medium may be integrated into the processor. The processor and the storage medium may exist in the ASIC. The ASIC may exist in the user terminal. Alternatively, the processor and storage medium may exist as separate components in the user terminal.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or apparatus, and storage may be similarly influenced across a plurality of apparatus. Such apparatus may include PCs, network servers, and portable apparatus.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A method performed by at least one processor, the method comprising:

obtaining first actual driving data associated with a first plurality of vehicles driving on an actual road within a first zone;

generating, based on the first actual driving data, vehicle driving patterns for each of a plurality of areas within the actual road, wherein the first actual driving data comprises speed data, heading data, and location data of at least one vehicle of the first plurality of vehicles; and controlling, based on the generated vehicle driving patterns, at least one of:

autonomous driving simulation; or autonomous driving of a vehicle, wherein the generating the vehicle driving patterns for each of the plurality of areas comprises:

performing denoising on the first actual driving data;

generating a first cluster and a second cluster by performing clustering on the denoised first actual driving data;

generating, based on data included in the first cluster, vehicle driving patterns associated with a first area; and generating, based on data included in the second cluster, vehicle driving patterns associated with a second area, and wherein the generating the first cluster and the second cluster comprises:

generating, using speed data of the denoised first actual driving data, a plurality of cluster candidates by performing clustering;

determining, as the first cluster and the second cluster, cluster candidates having a dispersion uniformity greater than or equal to a preset threshold out of the plurality of cluster candidates;

generating speed data statistical values for the first cluster; and generating speed data statistical values for the second cluster.

2. The method as claimed in claim 1, wherein the obtaining the first actual driving data comprises:

receiving road map data associated with a second zone comprising the first zone, wherein the road map data comprises a plurality of driving route links and a plurality of nodes;

obtaining second actual driving data associated with a second plurality of vehicles driving on an actual road within the second zone;

setting the first zone as a region of interest based on the plurality of driving route links; and extracting, from the second actual driving data, the first actual driving data associated with the region of interest based on location, wherein the plurality of areas is included in the region of interest.

3. The method as claimed in claim 1, wherein the obtaining the first actual driving data comprises:

receiving satellite map data associated with a second zone comprising the first zone;

obtaining second actual driving data associated with a second plurality of vehicles driving on an actual road within the second zone;

receiving information on at least one region including lanes on the satellite map data; and extracting, from the second actual driving data, the first actual driving data associated with the at least one region based on location, wherein the second actual driving data comprises the first actual driving data.

4. The method as claimed in claim 1, wherein the performing the denoising comprises:

performing, based on the heading data, primary filtering on the first actual driving data; and performing secondary filtering on the first actual driving data that has been subjected to the primary filtering by performing linear regression analysis.

5. The method as claimed in claim 1, wherein the vehicle driving patterns for each of the plurality of areas represent a driving speed change pattern of the at least one vehicle.

6. The method as claimed in claim 1, wherein a particular area of the plurality of areas comprises a first vehicle driving pattern and a second vehicle driving pattern, and the first vehicle driving pattern and the second vehicle driving pattern are different from each other.

7. The method as claimed in claim 1, further comprising:

performing an autonomous driving simulation associated with an actual road within the first zone based on the generated vehicle driving patterns for each of the plurality of areas.

8. A non-transitory computer-readable recording medium storing instructions that, when executed by at least one processor, cause:

obtaining first actual driving data associated with a first plurality of vehicles driving on an actual road within a first zone;

generating, based on the first actual driving data, vehicle driving patterns for each of a plurality of areas within the actual road, wherein the first actual driving data comprises speed data, heading data, and location data of at least one vehicle of the first plurality of vehicles; and controlling, based on the generated vehicle driving patterns, at least one of:

autonomous driving simulation; or autonomous driving of a vehicle, wherein the generating the vehicle driving patterns for each of the plurality of areas comprises:

performing denoising on the first actual driving data;

generating a first cluster and a second cluster by performing clustering on the denoised first actual driving data;

generating, based on data included in the first cluster, vehicle driving patterns associated with a first area; and generating, based on data included in the second cluster, vehicle driving patterns associated with a second area, and wherein the generating the first cluster and the second cluster comprises:

generating, using speed data of the denoised first actual driving data, a plurality of cluster candidates by performing clustering;

determining, as the first cluster and the second cluster, cluster candidates having a dispersion uniformity greater than or equal to a preset threshold out of the plurality of cluster candidates;

generating speed data statistical values for the first cluster; and generating speed data statistical values for the second cluster.

9. An information processing system comprising:

a communication interface;

a memory; and at least one processor coupled to the memory and configured to execute at least one computer-readable program included in the memory, wherein the at least one computer-readable program includes instructions configured to cause, when executed by the at least one processor, the information processing system to:

obtain first actual driving data associated with a first plurality of vehicles driving on an actual road within a first zone, generate, based on the first actual driving data, vehicle driving patterns for each of a plurality of areas within the actual road, wherein the first actual driving data comprises speed data, heading data, and location data of at least one vehicle of the first plurality of vehicles, and control, based on the generated vehicle driving patterns, at least one of:

autonomous driving simulation; or autonomous driving of a vehicle, wherein the instructions are configured to cause, when executed by the at least one processor, the information processing system to generate the vehicle driving patterns for each of the plurality of areas by:

performing denoising on the first actual driving data;

generating a first cluster and a second cluster by performing clustering on the denoised first actual driving data;

generating, based on data included in the first cluster, vehicle driving patterns associated with a first area; and generating, based on data included in the second cluster, vehicle driving patterns associated with a second area, and wherein the instructions are configured to cause, when executed by the at least one processor, the information processing system to generate the first cluster and the second cluster by:

generating, using speed data of the denoised first actual driving data, a plurality of cluster candidates by performing clustering;

determining, as the first cluster and the second cluster, cluster candidates having a dispersion uniformity greater than or equal to a preset threshold out of the plurality of cluster candidates;

generating speed data statistical values for the first cluster; and generating speed data statistical values for the second cluster.

10. The information processing system as claimed in claim 9, wherein the instructions are configured to cause, when executed by the at least one processor, the information processing system to obtain the first actual driving data by:

receiving road map data associated with a second zone comprising the first zone, wherein the road map data comprises a plurality of driving route links and a plurality of nodes;

obtaining second actual driving data associated with a second plurality of vehicles driving on an actual road within the second zone;

setting the first zone as a region of interest based on the plurality of driving route links; and extracting, from the second actual driving data, the first actual driving data associated with the region of interest based on location, wherein the plurality of areas is included in the region of interest.

11. The information processing system as claimed in claim 9, wherein the instructions are configured to cause, when executed by the at least one processor, the information processing system to obtain the first actual driving data by:

receiving satellite map data associated with a second zone comprising the first zone;

obtaining second actual driving data associated with a second plurality of vehicles driving on an actual road within the second zone;

receiving information on at least one region including lanes on the satellite map data; and extracting, from the second actual driving data, the first actual driving data associated with the at least one region based on location.

12. The information processing system as claimed in claim 9, wherein the instructions are configured to cause, when executed by the at least one processor, the information processing system to perform the denoising by:

performing, based on the heading data, primary filtering on the first actual driving data; and performing secondary filtering on the first actual driving data that has been subjected to the primary filtering by performing linear regression analysis.

13. The information processing system as claimed in claim 9, wherein the vehicle driving patterns for each of the plurality of areas represent a driving speed change pattern of the at least one vehicle.

14. The information processing system as claimed in claim 9, wherein a particular area of the plurality of areas comprises a first vehicle driving pattern and a second vehicle driving pattern, and the first vehicle driving pattern and the second vehicle driving pattern are different from each other.

15. The information processing system as claimed in claim 9, wherein the instructions are configured to cause, when executed by the at least one processor, the information processing system to:

perform an autonomous driving simulation associated with an actual road within the first zone based on the generated vehicle driving patterns for each of the plurality of areas.

16. The non-transitory computer-readable recording medium as claimed in claim 8, wherein the obtaining the first actual driving data comprises:

receiving road map data associated with a second zone comprising the first zone, wherein the road map data comprises a plurality of driving route links and a plurality of nodes;

obtaining second actual driving data associated with a second plurality of vehicles driving on an actual road within the second zone;

setting the first zone as a region of interest based on the plurality of driving route links; and extracting, from the second actual driving data, the first actual driving data associated with the region of interest based on location, wherein the plurality of areas is included in the region of interest.

17. The non-transitory computer-readable recording medium as claimed in claim 8, wherein the obtaining the first actual driving data comprises:

receiving satellite map data associated with a second zone comprising the first zone;

obtaining second actual driving data associated with a second plurality of vehicles driving on an actual road within the second zone;

receiving information on at least one region including lanes on the satellite map data; and extracting, from the second actual driving data, the first actual driving data associated with the at least one region based on location.

18. The non-transitory computer-readable recording medium as claimed in claim 8, wherein the performing the denoising comprises:

performing, based on the heading data, primary filtering on the first actual driving data; and performing secondary filtering on the first actual driving data that has been subjected to the primary filtering by performing linear regression analysis.

19. The non-transitory computer-readable recording medium as claimed in claim 8, wherein the vehicle driving patterns for each of the plurality of areas represent a driving speed change pattern of the at least one vehicle, wherein a particular area of the plurality of areas comprises a first vehicle driving pattern and a second vehicle driving pattern, and wherein the first vehicle driving pattern and the second vehicle driving pattern are different from each other.

20. The non-transitory computer-readable recording medium as claimed in claim 8, wherein the instructions, when executed by the at least one processor, further cause:

performing an autonomous driving simulation associated with an actual road within the first zone based on the generated vehicle driving patterns for each of the plurality of areas.

* * * * *